Patented June 1, 1937

2,082,520

UNITED STATES PATENT OFFICE 2,082,520

CONVERSION OF HYDROCARBON GASES TO LIQUIDS

Robert F. Ruthruff, Hammond, and Ward E. Kuentzel, Whiting, Ind., assignors to Standard Oil Company, Chicago, Ill., a corporation of Indiana No Drawing. Application December 17, 1934, Serial No. 757,904

17 Claims. (Cl. 196—10)

This invention relates to an improvement in the process of manufacturing liquid hydrocarbons of the gasoline boiling range from unsaturated gaseous hydrocarbons. More specifically it relates to improvements in the process of catalytic polymerization of unsaturated hydrocarbons of the ethylene series to yield gasoline-like liquid hydrocarbons, wherein catalysts of the type of sodium chloro-aluminate are used.

It is well known in the art that the gaseous unsaturated hydrocarbons of the ethylene series can be polymerized by aluminum chloride to yield liquid products, usually heavy in character, but these polymerization reactions in the presence of aluminum chloride are highly uncontrollable and on account of their exothermic character the reaction is likely to proceed with undue violence with the result that no useful products are formed. It is also well known in the art that aluminum chloride may be combined with various other metallic chlorides to form stable double salts which possess very considerable activity for the polymerization of the gaseous olefinic hydrocarbons but which nevertheless do not cause these reactions to proceed with undue violence. One example of this type of stable double-salt catalyst is sodium chloro-aluminate and as other examples there may be mentioned lithium chloro-aluminate, calcium chloro-aluminate, barium chloro-aluminate, sodium bromo-aluminate, cuprous chloro-aluminate, mercury bromo-aluminate and antimony bromo-aluminate.

We have found that while these compounds can be used as catalysts for the polymerization of the gaseous olefinic hydrocarbons under a wide variety of conditions, it is necessary to operate within closely defined limits of conditions, i. e. as to temperature, pressure and time of contact, if optimum conversion to liquid hydrocarbons of the gasoline boiling range is to be obtained.

In carrying out our process, the catalyst is first prepared by melting together the aluminum halide and the chosen metallic halide, such as sodium chloride, using approximately the proportions calculated for the stable double salt of the two given halides. This melted mixture may then be distributed upon pumice or on other suitable inert carrier and the granular catalyst thus prepared may be placed in a suitable catalyst chamber. On the other hand, we may also, in certain instances, make use of the catalyst in molten form, i. e. actually bubble the reacting gases through the molten catalyst without the use of any inert support or carrier agent.

No special apparatus is necessary for carrying out our process. The catalyst is placed in a suitable catalyst chamber, which ordinarily will be provided with internal cooling means which may or may not involve heat exchange with the incoming gases or with streams from other parts of the system, and the reacting gases are passed through the chamber under pressure as later described, following which they are cooled and liquid products are recovered. Ordinarily the entire olefin content of the initial gas mixture will be consumed and hence there will be no olefins to be recycled. Under certain conditions, however, we may prefer to operate with incomplete conversion and recycle a certain proportion of, or a certain concentrated olefin fraction from, the unconverted gases.

The gases which may be treated by our process include the various unsaturated or olefin gases, such as ethylene, propylene, butylene and isobutylene. These will ordinarily be treated in admixture with inert or saturated gases, i. e., methane, ethane, propane, and butane, and the mixtures may also contain certain amounts of hydrogen. The concentration of the unsaturated gases in the mixture passed into the catalyst chamber may range from 15% to 70% of olefins, but preferably ranges from 25% to 50% of olefins. Ethylene cannot ordinarily be treated by our process when alone or in admixture with inert hydrocarbons only, but ethylene may be present in the mixture treated provided that other unsaturated hydrocarbons, such as propylene and butylene are present in equal or larger amounts.

As we have previously stated, we have found that the operating conditions must be maintained within relatively narrow limits if maximum yields of gasoline-like liquid hydrocarbons are to be obtained from these olefinic gases. This will be seen from the various following tables, which respectively show the effect of time, temperature and pressure on the yield and composition of the liquid products. The data shown in these tables apply specifically to sodium chloro-aluminate but within reasonable limits they also apply to other catalysts of this same type, as previously described.

EFFECT OF TEMPERATURE ON YIELD

Pressure constant = 750 lbs./square inch
Time constant = flow 3,400 cu. ft. free gas/cu. ft. free catalyst volume/hr.

| Temperature °F. | Weight, percent conversion of olefins to liquid polymers | | |
|---|---|---|---|
| | Propylene | Butylene | Propylene-butylene |
| 250 | 49.5 | 80 | 78.5 |
| 300 | 72.0 | 110 | 104 |
| 350 | 78.8 | 102 | 99.5 |
| 400 | 72.0 | 98 | 87 |
| 450 | 66.0 | 94 | |
| 500 | 62.0 | | |
| 550 | 60.0 | | |

In the experiments represented by the above table and in all subsequent tables of experimental data unless otherwise specifically noted, the "propylene" was about 31% propylene and 69% propane, the "butylene" was about 33% butylenes and 67% butanes, and the "propylene-butylene" was about 20% propylene plus 20% butylenes and 60% propane plus butanes.

In the above and elsewhere in the specification and claims hereof, the reaction time factor is defined in terms of the flow of "cu. ft. free gas/cu. ft. free catalyst volume/hour". The expression "cu. ft. free gas" refers to the volume of feed gas at atmospheric temperature and pressure, i. e. at 60° F. and 14.7 lbs./sq. in. pressure absolute. The expression "cu. ft. free catalyst volume" refers to the total reaction chamber volume occupied by catalyst multiplied by the fractional free space in the catalyst. For granular catalysts the latter is readily determined by common tests. If molten catalyst is used it must be determined by observing the volume occupied by the catalyst when no gas is passing compared with the observed volume when feed gas is passing through the catalyst. Generally, the assumption of 0.5 fractional free space will apply to either granular or molten catalysts with sufficient accuracy.

It will be seen from the foregoing table that useful and desirable conversions of olefinic gases to liquids will be obtained between the temperatures of about 200° F. to 550° F., using these catalysts. It is generally preferable, however, to operate within the range 250–450° F. and we specifically prefer to operate within the range 300–350° F. since this range gives a maximum yield of liquid products. The fact that yields of more than 100% may be obtained, based on the weight content of gaseous olefins in the original mixture, indicates that under the conditions of the reaction the olefins are apparently activated by the catalyst to a sufficient degree so that they partially react with the paraffins in the gaseous mixture to form liquid products. It will be seen that there is relatively little difference in results between butylene and mixtures of butylene and propylene. Propylene by itself, however, gives somewhat lower conversion to liquids than does butylene or propylene-butylene mixtures, although the effect of temperature on conversion is the same and the preferred operating range is therefore the same for propylene, butylene, or mixtures thereof. It will be seen that propylene is "activated" by the presence of butylene in our process since there is no essential difference in the yields from propylene-butylene mixtures and from butylene, despite the lower yields obtained when propylene is treated alone.

This is true in greater extent of ethylene. We have found that ethylene, treated by itself or in admixture with saturated and inert gases only, gives little if any conversion to liquid polymers under the conditions of our process. Nevertheless, if ethylene is present in admixture with propylene and/or butylene then under our preferred operating conditions a considerable proportion of the ethylene will be "activated" and polymerized to liquid products along with the propylene and/or butylene.

The temperatures used in our process also have considerable effect on the composition of the product as well as on the yield of the product, as will be seen from the following table:

EFFECT OF TEMPERATURE ON COMPOSITION OF PRODUCT*

Propylene, at 750 lbs./sq. in. pressure and flow of 3400 cu. ft. free gas/cu. ft. free catalyst volume/hr.

| Temperature, ° F. | Product, percent off at 392° F. |
|---|---|
| 250 | 7.0 |
| 275 | 12.5 |
| 325 | 16.0 |
| 350 | 22.5 |
| 400 | 35.0 |
| 450 | 46.0 |
| 500 | 62.0 |
| 550 | 68.0 |

* NOTE.—For total yield of liquid polymers see preceding table.

It will be seen that the gasoline content of the product, which is defined as the percent distilled off at 392° F., rises rapidly above 350° F. operating temperature. Ordinarily, we prefer to operate our catalytic polymerization process under conditions for maximum total liquid yields, i. e. 300–350° F. as previously noted, and to convert the higher boiling oils to gasoline by use of conventional oil cracking processes. It may be noted that the balance of the product lying above the gasoline boiling range is a relatively light gas oil which is well suited for conversion into gasoline by conventional cracking processes. Nevertheless, in some cases, as for example, when adequate conventional oil cracking apparatus is not available, we prefer to obtain the maximum gasoline yield possible direct from the polymerization process, and in that case, we operate in the range of 350–550° F. and preferably, in the range of 450–550° F.

The effect of pressure on the operation and results of our process is shown by the following tables for various conditions of time and temperature:

EFFECT OF PRESSURE ON YIELD

*Propylene-butylene*

Temperature constant=350° F.

| Weight, percent conversion olefins to liquid polymers | | | |
|---|---|---|---|
| Flow, cu. ft. free gas/cu. ft. free catalyst volume/hr. | 430 | 860 | 1720 |
| Pressure, lbs./sq. in. | | | |
| 200 | | 72 | 1 50 |
| 750 | | 71 / 1 89 | 93 |

1 Approximate.

*Propylene*

Temperature constant=350° F.
Rate constant=1,720 cu. ft. free gas/cu. ft. free catalyst volume/hr.

| Pressure, lbs./sq. in. | Weight, percent conversion of olefins to liquid polymers |
|---|---|
| 750 | 85.5 |
| 1,500 | 83.5 |
| 3,000 | 81.0 |

It will be seen from the foregoing data that pressures below 200 lbs. per square inch are not desirable and the pressures above 750 lbs. per square inch will not give any advantages. Hence, we prefer to operate within the range of 200–1000 lbs./sq. in. and specifically, we prefer to operate in the range of 500–750 lbs. per square inch.

The effect of the time factor on the results of our process is shown by the following table:

EFFECT OF TIME ON YIELD

Pressure constant=750 lbs./sq. in.
Temperature constant=350° F.

| Flow, cu. ft. free gas per cu. ft. free catalyst volume per hour | Weight, percent conversion of olefins to liquid polymers | | |
|---|---|---|---|
| | Propylene | Propylene-butylene | Butylene |
| 860 | 90.0 | 90 | 92 |
| 1720 | 87.0 | 93 | 96 |
| 3440 | 78.8 | 99.6 | 102 |
| 5160 | 63.0 | 47 | 101.5 |
| 6880 | | | 78 |

We may use a reaction time, expressed as rates of flow, of from 400 to 8600 cu. ft. free gas/cu. ft. free catalyst volume/hr., but as will be seen from the foregoing data, it is preferable to use rates of flow of from 850 to 5200 cu. ft. free gas/cu. ft. free catalyst volume/hour. The foregoing preferred operating limits apply particularly to the treatment of butylene or propylene or mixtures of the two, with or without smaller proportions of ethylene, when the concentration of the total unsaturated or olefinic gases in the mixture passed to the catalyst chamber is in the preferred range of 25–50% of olefins.

More specifically, depending on the identity of the predominating olefinic constituent in the feed gas to our process, we prefer to operate at the following flow rates:—

|  | Preferred flow range cu. ft. free gas per cu. ft. free catalyst volume per hour |
|---|---|
| Propylene | 400–1700 |
| Propylene-butylene | 800–5000 |
| Butylene | 1500–6000 |

We may, however, vary our preferred rate of flow if the olefin content of the feed gas is considerably higher or lower than the preferred range of 25–50% olefins. If the concentration of total olefinic gases in the gas passed to the catalyst chamber is as low as 15%, we will ordinarily cut the rate of flow to about one-half of the above rate, while if the concentration of olefins in the gas passed to the catalyst chamber is as high as 70% we will ordinarily double the above rate of flow of the gas.

The above preferred operation conditions apply specifically to the use of sodium chloro-aluminate as a catalyst, but they may also be used satisfactorily with any other catalyst, as hereinabove described, of the stable double halide type, wherein aluminum chloride is one component of the double salt.

By operating within our preferred ranges of temperature, pressure and time, we obtain maximum conversion of the olefinic gases to valuable liquid products. As previously set forth, we may operate either to obtain the maximum yield of total liquid products or to obtain the maximum yield of liquid products of gasoline boiling range. The gasoline produced by our process is superior to ordinary cracked gasoline, having a much higher antiknock rating. It may also show improved "ethylization" characteristics, i. e. show a greater increase in antiknock value per added unit of lead tetraethyl than is the case with ordinary cracked gasoline. A further advantageous characteristic of the gasoline produced by our improved process is the fact that its antiknock value does not fall off as rapidly with increasing boiling point as is the case with cracked gasoline, as may be determined if our improved product be fractionated into fractions of progressively increasing boiling point and the antiknock value of each fraction determined separately. In the case of cracked gasolines the antiknock value is relatively poor unless considerable proportions of low boiling materials are present, but in the case of our process a gasoline relatively free from low boiling constituents will still show a satisfactory antiknock value. Hence we may operate our process to produce a gasoline relatively free from low boiling constituents and hence having a high flash point, and we have found that this is suitable as a "safety fuel" for aviation engines. We have also found that fuels of such characteristics, as produced by our process, are particularly suitable as fuel for internal combustion engines of the type commonly used in tractors.

The foregoing being a full and complete description of our invention it will be understood that we are not limited therein except as expressed in the claims as follows:—

We claim:

1. In a process for catalytically polymerizing olefinic gases containing olefinic hydrocarbons having a molecular weight higher than ethylene to liquid hydrocarbons, the steps of passing said olefinic gases through a catalyst of the aluminum halide stable double metallic salt type at a rate of from 850–5200 cu. ft. free gas/cu. ft. free catalyst volume/hour while at a temperature of 300–350° F. and under a pressure of 500–750 lbs./sq. in. above atmospheric, and recovering and separating liquid products from unconverted gases.

2. In a process for catalytically polymerizing olefinic gases containing olefinic hydrocarbons having a molecular weight higher than ethylene to liquid hydrocarbons containing a substantial proportion of liquid hydrocarbons of the gasoline boiling range, the steps of passing said olefinic gases through a catalyst of the aluminum halide stable double metallic salt type at a rate of from 850–5200 cu. ft. free gas/cu. ft. free catalyst volume/hour while at a temperature of 450°–550° F. and under a pressure of 200–1000 lbs./sq. in. above atmospheric, and recovering and separating liquid products from unconverted gases.

3. The process in accordance with claim 1 wherein the catalyst is sodium chloro-aluminate.

4. In a process for catalytically polymerizing olefinic gases containing olefinic hydrocarbons having a molecular weight higher than ethylene to liquid hydrocarbons containing a substantial proportion of liquid hydrocarbons of the gasoline boiling range, the steps of passing said olefinic gases through a catalyst of the aluminum halide stable double metallic salt type at a rate of from 850–5200 cu. ft. free gas/cu. ft. free catalyst volume/hour while at a temperature of 350°–550° F. and under a pressure of 200–1000 lbs./sq. in. above atmospheric, and recovering and separating liquid products from unconverted gases.

5. The process in accordance with claim 4 wherein the catalyst is sodium chloro-aluminate.

6. The process of producing a high flash safety gasoline comprising passing olefinic gases containing olefinic hydrocarbons having a molecular weight higher than ethylene through a catalyst of the aluminum halide stable double metallic salt type at a rate of from 850–5200 cu. ft. free gas/cu. ft. free catalyst volume/hour while at a temperature of 300–350° F. and under a pressure of 200–1000 lbs./sq. in. above atmospheric, and recovering and separating liquid products containing said gasoline from unconverted gases.

7. The process of producing a high flash safety gasoline comprising passing olefinic gases containing olefinic hydrocarbons having a molecular weight higher than ethylene through a catalyst of the aluminum halide stable double metallic salt type at a rate of from 850–5200 cu. ft. free gas/cu. ft. free catalyst volume/hour while at a temperature of 450°–550° F. and under a pressure of 200–1000 lbs./sq. in. above atmospheric, and recovering and separating liquid products containing said gasoline from unconverted gases.

8. In a process for catalytically polymerizing olefinic gases to liquid hydrocarbons, the steps of passing a gaseous mixture containing propylene as its predominating olefinic constituent through a catalyst of the aluminum halide stable double metallic salt type at a rate of from 400–1700 cu. ft. free gas/cu. ft. free catalyst volume/hour while at a temperature of 300–450° F. and under a pressure of 200–1000 lbs./sq. in. above atmospheric, and recovering and separating liquid products from unconverted gases.

9. In a process for catalytically polymerizing olefinic gases to liquid hydrocarbons, the steps of passing a gaseous mixture containing butylene as its predominating olefinic constituent through a catalyst of the aluminum halide stable double metallic salt type at a rate of 1500–6000 cu. ft. free gas/cu. ft. free catalyst volume/hour while at a temperature of 300–550° F. and under a pressure of 500–750 lbs./sq. in. above atmospheric, and recovering and separating liquid products from unconverted gases.

10. In a process for catalytically polymerizing olefinic gases to liquid hydrocarbons, the steps of passing a gaseous mixture containing propylene and butylene in relatively substantial amounts as its olefinic constituents through a catalyst of the aluminum halide stable double metallic salt type at a rate of from 800–5000 cu. ft. free gas/cu. ft. free catalyst volume/hour while at a temperature of 300–450° F. and under a pressure of 500–750 lbs./sq. in. above atmospheric, and recovering and separating liquid products from unconverted gases.

11. In a process for catalytically polymerizing olefinic gases containing olefinic hydrocarbons having a molecular weight higher than ethylene to liquid hydrocarbons, the steps of passing said olefinic gases through a catalyst comprising sodium chloro-aluminate at a rate of from 850–5200 cu. ft. free gas/cu. ft. free catalyst volume/hour while at a temperature of 300–550° F. and under a pressure of 200–1000 lbs./sq. in. above atmospheric, and recovering and separating liquid products from unconverted gases.

12. In a process for catalytically polymerizing an admixture of normally gaseous hydrocarbons containing propane, proplyene, butane and butylene to liquid hydrocarbons; the steps of contacting said admixture of normally gaseous hydrocarbons with a sodium chloro-aluminate catalyst at the rate of from 850–5200 cu. ft. free gas/cu. ft. free catalyst volume/hour while at a temperature of 300–550° F. and under a pressure of 500–750 lbs./sq. in. above atmospheric; and recovering and separating liquid products from the unconverted gases.

13. In a process for catalytically polymerizing normally gaseous hydrocarbons containing propane, propylene, butane and butylene to liquid hydrocarbons containing a substantial composition of liquid hydrocarbons of the gasoline boiling range; the steps of contacting said normally gaseous hydrocarbons with a stable aluminum halide double metallic salt at a rate of from 850–5200 cu. ft. free gas/cu. ft. free catalyst volume/hour while at a temperature of 450–550° F. and under a pressure of 500–750 lbs./sq. in. above atmospheric; and recovering and separating liquid products from the unconverted gases.

14. In a process for the conversion of an admixture of normally gaseous hydrocarbons into liquid hydrocarbon products, the steps comprising contacting an admixture of normally gaseous petroleum hydrocarbons containing paraffins and olefins with at least two carbon atoms in each molecule with a catalyst comprising sodium chloro-aluminate at the rate of from 400 to 8600 cu. ft. free gas/cu. ft. free catalyst volume/hour while at a temperature of 300–550° F. and under a pressure of 500–3000 lb. per square inch, and recovering and separating liquid products from unreacted gases.

15. In a process for the conversion of an admixture of normally gaseous hydrocarbons into liquid hydrocarbon products, the steps comprising contacting an admixture of saturated and unsaturated normally gaseous hydrocarbons containing four carbon atoms each in the molecule with a catalyst comprising sodium chloro-aluminate at a temperature of 300–550° F. and under a pressure of 500–3000 lbs. per square inch, and recovering and separating liquid products from the unconverted gases.

16. In a process for the conversion of an admixture of normally gaseous hydrocarbons into liquid hydrocarbon products, the steps comprising contacting an admixture of normally gaseous hydrocarbons containing paraffins with at least two carbon atoms in the molecule and olefins with at least three carbon atoms in the molecule with a catalyst comprising sodium chloro-aluminate at a rate of from 400 to 8600 cu. ft. free gas/cu. ft. free catalyst volume/hour while at a temperature within the range of 300–550° F. and under pressure of 200–3000 lbs. per square inch, and recovering and separating liquid products from unconverted gases.

17. In a process for the conversion of an admixture of normally gaseous hydrocarbons into liquid hydrocarbon products, the steps comprising contacting an admixture of normally gaseous hydrocarbons containing paraffins with at least two carbon atoms in the molecule and appreciable amounts of propylene and butenes with a catalyst comprising sodium chloro-aluminate at a rate of from 860 to 5200 cu. ft. free gas/cu. ft. free catalyst volume/hour while at a temperature within the range of 300–550° F. and under a pressure within the range of 200–3000 lbs. per square inch, and separating and recovering liquid products from unreacted products.

ROBERT F. RUTHRUFF.
WARD E. KUENTZEL.